US011745612B1

(12) United States Patent
Ocampo Villegas et al.

(10) Patent No.: US 11,745,612 B1
(45) Date of Patent: Sep. 5, 2023

(54) THERMAL MANAGEMENT FOR VEHICLE CHARGING SYSTEMS

(71) Applicant: Zoox, Inc., Foster City, CA (US)

(72) Inventors: Jaime Andres Ocampo Villegas, Foster City, CA (US); Vamsi Krishna Pathipati, San Carlos, CA (US); Bryan Emrys Booth, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 150 days.

(21) Appl. No.: 17/405,853

(22) Filed: Aug. 18, 2021

(51) Int. Cl.
*B60L 53/302* (2019.01)
*H01M 10/6554* (2014.01)
*H01M 10/6569* (2014.01)
*B60L 53/36* (2019.01)
*B60L 53/122* (2019.01)
*H01M 10/6568* (2014.01)

(52) U.S. Cl.
CPC .......... *B60L 53/302* (2019.02); *B60L 53/122* (2019.02); *B60L 53/36* (2019.02); *H01M 10/6554* (2015.04); *H01M 10/6568* (2015.04); *H01M 10/6569* (2015.04); *B60L 2210/30* (2013.01); *H01M 2220/20* (2013.01)

(58) Field of Classification Search
CPC ...... B60L 53/302; B60L 53/122; B60L 53/36; B60L 2210/30; H01M 10/6554; H01M 10/6568; H01M 10/6569; H01M 2220/20
See application file for complete search history.

(56) References Cited

U.S. PATENT DOCUMENTS

2020/0339010 A1* 10/2020 Villanueva ............ H01M 10/63
2021/0161033 A1* 5/2021 McEathron ........ H05K 7/20872

FOREIGN PATENT DOCUMENTS

WO WO-2011149868 A1 * 12/2011 ......... F28D 15/0266

* cited by examiner

*Primary Examiner* — Adam A Arciero
(74) *Attorney, Agent, or Firm* — Lee & Hayes, P.C.

(57) ABSTRACT

Operations associated with charging a vehicle may generate thermal energy. A passive thermal management solution may dissipate the thermal energy without requiring additional active components and without adding significant thermal loads to an existing thermal management system. In some examples, a passive heat exchanger may include a cold plate coupled to power electronics. In addition, the passive heat exchanger may include a condenser that is fluidly coupled to the cold plate and is positioned in an airflow path.

20 Claims, 4 Drawing Sheets

THERMAL MANAGEMENT FOR VEHICLE CHARGING SYSTEMS

BACKGROUND

Vehicles (e.g., electric or hybrid) often rely on rechargeable batteries to supply electrical power to various components (e.g., electric motors), and recharging operations can generate significant heat. For example, heat may be generated by onboard charging components (e.g., physical contacts or receptacle, inductive charging coils, power electronics, and power storage units) and/or offboard charging components (e.g., direct current (DC) source, power electronics, charging plug, and/or inductive charging coils). Often, the heat that is generated during charging must be managed (e.g., dissipated, rejected, ejected, etc.) to avoid component failures, faults, safety risks, and the like.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

As described above, operations associated with charging a vehicle may generate heat in quantities that are sufficient to warrant at least some form of thermal management. This disclosure relates to passive thermal management solutions that dissipate heat generated during vehicle charging without requiring additional active components (e.g., in addition to the active fan(s) and/or coolant pump(s) that may already operate with the vehicle to dissipate heat arising from computing systems, climate control systems, or other components or systems or thermal generators) and without adding significant thermal load(s) to a vehicle's existing thermal management system. For example, onboard charging components may include an onboard power receiver (e.g., onboard physical contacts, plug receiver, or onboard inductive charging coil); onboard power electronics to convert the received power (e.g., change from alternating current (AC) to direct current (DC) and/or change voltage); and a vehicle power storage unit (e.g., one or more batteries, capacitors, fuel cells, or other energy storage devices) to store the converted power. At least some heat may result from operations performed by each of these components, and examples of this disclosure include passive thermal management solutions to reject, dissipated, and/or eject the heat. In some examples, offboard charging components (e.g., offboard power electronics) may also generate significant heat, which may also be managed using passive thermal management solutions described in this disclosure, without requiring significant additional onsite (e.g., at the charging station) active cooling components.

Vehicle charging may take various forms. For example, in some instances vehicle charging may occur via a contact-based connection (e.g., a plug connected to a plug receiver, one or more physical contacts, etc.), whereas in other cases vehicle charging may occur via a non-contact based connection (e.g., inductive charging coils). In either case, the vehicle typically includes some type of power storage unit (e.g., one or more batteries or battery packs) that receives power for storage (e.g., is charged) from offboard electrical components at a charging station or charging unit (e.g., home-based charger or commercial charger). In the case of contact-based charging, the offboard charging components may include some type of plug, connector (e.g., Type 1, Type 2, GB/T, CHAdeMO, CCS-Type 1, CCS-Type 2, etc.), or other electrical contact that is physically connected to a receptable, inlet, or other electrical contact on the vehicle, and by way of the physical contact, power may be transferred from offboard components to onboard components. In some examples, the offboard components may releasably physically connect or insert into a receiver on a side of the vehicle (e.g., front, back, left, or right). In some examples, offboard components may physically contact onboard components underneath the vehicle. In addition, power electronics (e.g., power converter, power inverter, power rectifier, etc.) may be arranged onboard and/or offboard to modify power as it is transferred from the charging station to the vehicle. For example, the charging station may include offboard power electronics configured to convert AC power from the grid to usable DC, and the onboard charging system may include onboard power electronics to convert DC power to a form (e.g., different voltage) that is usable by the vehicle.

Non-contact-based charging may include some similarities to contact-based charging. For example, non-contact charging typically includes some type of onboard power storage unit that receives power for storage from offboard electrical components at a charging station. In addition, non-contact-based systems may also include power electronics, which may be configured to perform at least some functions similar to those in contact-based systems. However, in contrast to a physical connection between offboard and onboard components used with contact-based solutions, non-contact-based charging typically includes an offboard (or primary) charging coil that transfers power to an onboard (or secondary) charging coil (e.g., across an air gap), such as by using induction. In addition, in non-contact-based charging, power electronics may perform different or additional operations to those in a contact-based system. For example, offboard power electronics may be configured to convert DC power to AC power for transmission by an offboard charging coil. In addition, the onboard charging system may include onboard power electronics to convert AC power received by the onboard charging coil to DC that is storable by the vehicle power storage unit.

In both contact-based charging and non-contact-based charging, one or more of these charging components may generate heat when performing operations associated with charging the vehicle (e.g., transmitting, converting, and storing the power). In some examples of this disclosure, these components that generate heat may be referred to as "thermal generators." As such, the heat must often be dissipated to reduce the likelihood of component failure (e.g., from overheating), electrical faults, safety hazards, etc. Conventional thermal management solutions for vehicles often use active cooling systems, which may include one or more active components, such as fans, coolant pumps, etc. However, active components typically require additional power, which may consume valuable electrical resources (e.g., from a battery), require additional maintenance, and introduce additional opportunities for component failure. Some conventional thermal management solutions may simply connect onto existing coolant loops, which may not necessarily add active components; however, these solutions still add a thermal load to the active thermal management system (active cooling system) that can further strain the potentially already stressed components and consume thermal-management resources intended for other components. For example, in some vehicles (e.g., autonomous vehicles or semi-autonomous vehicles), the active thermal management system may cool computing devices (e.g., used to determine autonomous driving operations), which may be sensitive to temperature fluctuations. As such, consuming thermal management resources, which would otherwise be used to maintain steady computing-device temperatures, may disrupt computing operations due to increases in system temperatures.

In contrast to conventional thermal management systems, examples of the present disclosure include an onboard passive heat exchanger (e.g., passive cooling system or passive system) that need not include active components, which would require additional powering, and that does not add a thermal load to the existing vehicle coolant loop, thereby reserving thermal management resources for other components (e.g., engine components, computing devices, etc.). In some examples, the onboard passive heat exchanger includes a cold plate reservoir that contains a refrigerant and that is in physical contact with one or more onboard charging components (e.g., onboard power electronics unit of a vehicle, onboard charging coil, power storage unit, etc.). In addition, the onboard passive heat exchanger includes a condenser that is in fluid communication with the cold plate reservoir (both of which are under pressure). In examples, the onboard passive heat exchanger may include a passive loop thermosyphon. The passive heat exchanger can be positioned adjacent a radiator and/or in the air flow path of the radiator fan (e.g., downstream from the radiator). As such, heat from the onboard charging component may transfer to the refrigerant contained in the cold plate reservoir, which transitions to a vapor and convectively flows to the condenser. Once heat is dissipated through the condenser, the refrigerant condenses and convectively flows back to the cold plate reservoir to be used in the heat exchange process.

In examples of this disclosure, relying at least partially on the convective flow of the refrigerant and pressure of the system (e.g., configured based on the refrigerant type), the refrigerant moves through the system without any pump or other active component. In addition, by placing the condenser in the air flow created by the radiator fan and downstream of the radiator, the condenser is able to dissipate the heat without adding an additional thermal load to the existing, active thermal management system of the vehicle. Furthermore, examples of the present disclosure implement the passive heat exchanger in a manner that takes advantage of benefits of the system, while minimizing potential drawbacks. That is, in some use cases involving a vehicle, a cold plate reservoir containing a refrigerant may be less effective and not recommended where the motion of the vehicle (e.g., pitch, yaw, roll, etc.) unevenly distributes the refrigerant in the cold plate. However, in examples of this disclosure, by using the onboard passive heat exchanger with a charging-specific component, such as the power electronics unit, some examples of the present disclosure operate when the vehicle is stationary (e.g., while charging). As such, these examples of the onboard passive heat exchanger are not likely to be affected by potential uneven refrigerant distribution in the cold plate reservoir that might otherwise (e.g., when the vehicle is in motion) reduce the effectiveness of the passive heat exchanger.

In some examples, a passive heat exchanger may be used with offboard charging components. For example, an offboard passive heat exchanger may include a cold plate reservoir that contains a refrigerant and that is in physical contact with an offboard charging component of a charging station (e.g., power electronics unit coupled to offboard charging coil). In addition, the offboard passive heat exchanger may include a condenser that is in fluid communication (e.g., via one or more conduits) with the cold plate reservoir and that may dissipate heat to ambient air. That is, based on the thermal energy passed from the offboard charging component to the liquid refrigerant in the cold plate, the liquid refrigerant in the cold plate may transition to vapor refrigerant that flows to the condenser. In the condenser, the thermal energy may conductively dissipate to ambient air, thereby cooling and condensing the vapor refrigerant to liquid refrigerant that flows back to the cold plate. Similar to the onboard passive heat exchanger, the refrigerant of the offboard passive heat exchanger may flow through the system without any pump or other active component, and the condenser may dissipate the heat to ambient air without needing any active components.

The techniques described herein can be implemented in a number of ways to manage thermal conditions related to charging or other operations. Example implementations are provided below with reference to the following figures. Example implementations are discussed in the context of autonomous vehicles; however, the methods, apparatuses, and components described herein can be applied to a variety of components (e.g., charging a battery in a robotic system), and are not limited to autonomous vehicles. For instance, the techniques described herein may be utilized in driver-controlled vehicles electric vehicles. Additionally, or alternatively, the techniques can be utilized in connection with charging batteries of land vehicles, watercraft, aircraft, robots, computing devices, or any other battery powered device.

Figure 1:
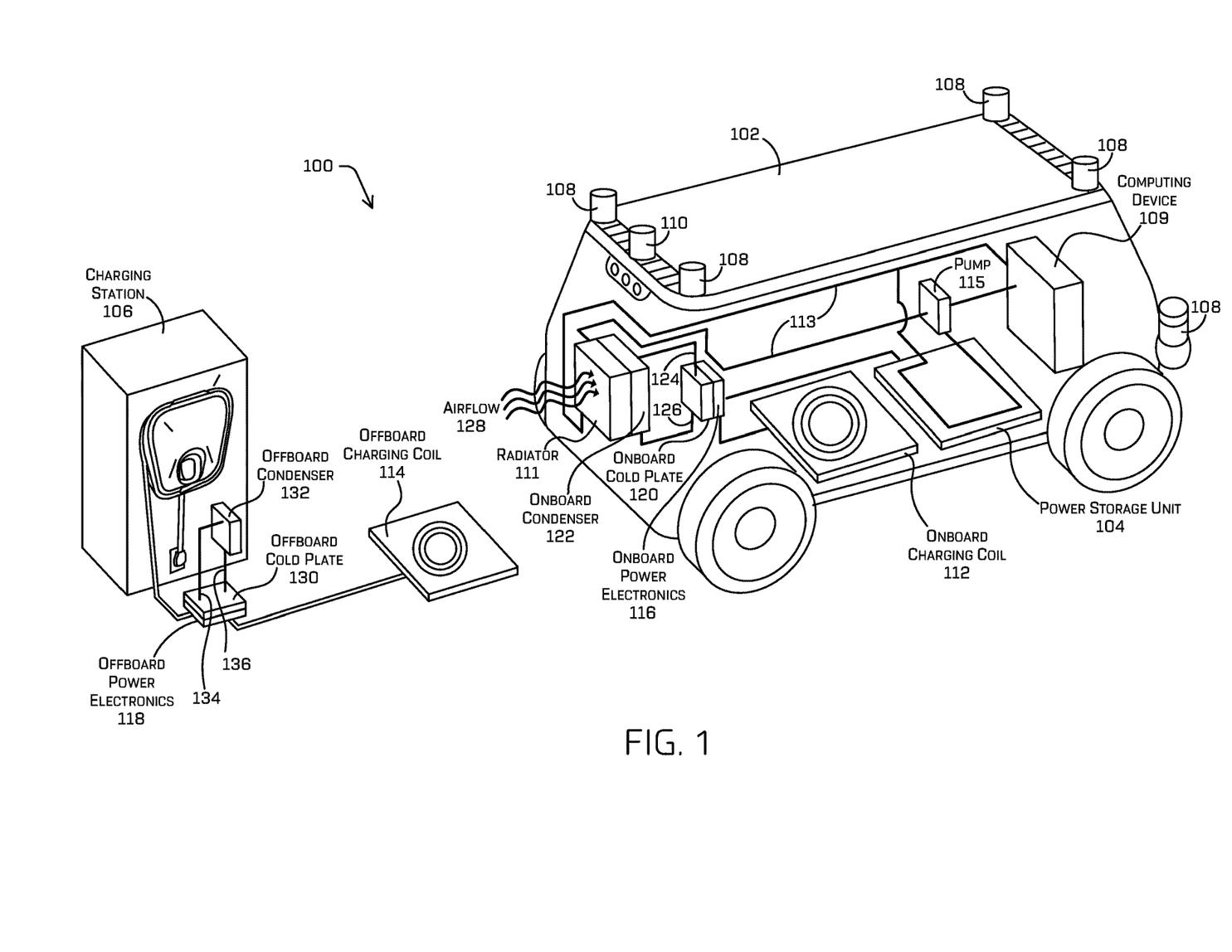
FIG. 1 is an environment including onboard charging components associated with an example vehicle, example offboard charging components that may be used to charge the vehicle, and example passive thermal management solutions for onboard and offboard components.

Referring to FIG. 1, FIG. 1 is an example environment 100 in which an example vehicle 102 may maneuver into position to recharge one or more power storage units 104 via non-contact charging methods using components at a charging station 106 (e.g., residential or commercial charging station or charging unit). The example vehicle 102 may be any configuration of vehicle, such as, for example, a van, a sport utility vehicle, a cross-over vehicle, a truck, a bus, an agricultural vehicle, and a construction vehicle. The vehicle 102 may be powered by one or more electric motors, one or more internal combustion engines, any combination thereof (e.g., by a hybrid power train), and/or any other suitable electric power sources. For the purpose of illustration, the example vehicle 102 is an at least partially electrically powered vehicle having two electrical propulsion units configured to provide the vehicle 102 with the ability to maneuver, each including a motor/inverter electrically coupled to one or more power storage units 104 configured to be recharged, as explained herein. For example, the vehicle 102 may be a bidirectional vehicle having a first drive module positioned in a front end and a second drive module positioned in a rear end. As used herein, a bidirectional vehicle is one that is configured to switch between traveling in a first direction of the vehicle and a second, opposite, direction of the vehicle. In other words, there is no fixed "front" or "rear" of the vehicle 102. In other examples, the techniques described herein may be applied to vehicles other than bidirectional vehicles.

The vehicle 102 may also include sensors 108, which may include a perception sensor, including a sensor capturing data of an environment around the vehicle 102 (e.g., lidar, camera, time-of-flight, sonar, radar, etc.). In some examples, the sensors 108 may send data to one or more computing devices 109 configured to control one or more operations of the vehicle 102 (e.g., autonomously control and/or semi-autonomously control when determining autonomous driving operations). For example, the one or more computing devices 109 may include one or more of the components described with respect to the system 400 in FIG. 4, such as a perception component, localization component, predictor, planner, and system controller, which may detect objects in the environment and determine one or more trajectories for the vehicle to follow. In addition, the vehicle 102 can also include one or more communication units 110 that enable communication between the vehicle 102 and one or more other local or remote computing devices via one or more protocols. For example, the vehicle 102 may exchange communications with other devices in the environment 100 (e.g., the charging station 106, components of the charging station, etc.) and/or with remote devices (e.g., a remote teleoperation computing device; a backend server associated with managing or controlling operations of the vehicle 102 and/or the charging station 106; etc.). Communications may be exchanged via physical and/or logical interfaces. For example, the communication unit 110 may enable Wi-Fi-based communication such as via frequencies defined by the IEEE 802.11 standards, short range wireless frequencies (e.g., Bluetooth, Zigbee, etc.), cellular communication (e.g., 2G, 3G, 4G, 4G LTE, 5G, etc.), satellite communication, dedicated short range communications (DSRC), or any suitable wired or wireless communications protocol that enables the respective computing device to interface with the other computing device(s).

The vehicle 102 may further include a radiator 111 (e.g. radiator core) fluidly coupled via coolant lines 113 to other onboard components (e.g., thermal generators), such as a pump 115, the power storage unit 104, and the computing device 109. The coolant lines 113 are an example, and in other instances, coolant lines may also service the engine or motor and/or other onboard components. In addition, the vehicle 102 may include a fan (e.g., fan 117 in FIG. 2) to move an airflow 128 across the radiator 111.

In examples of the disclosure, the example vehicle 102 may be configured to charge the power storage unit 104 via non-contact charging methods using components of the charging station 106. For example, the vehicle 102 may include an onboard charging coil 112 (e.g., mounted underneath the vehicle) to receive power from an offboard charging coil 114. In addition, the vehicle 102 may include onboard power electronics 116 (e.g., inverter, rectifier, and/or a bi-directional AC to DC converter) to modify the power (e.g., adjust voltage, change from AC to DC, etc.) for storage in the power storage unit 104. In some examples, the onboard power electronics 116 may modify power being distributed from the power storage unit 104 to other vehicle electric components (e.g., onboard charging coil 112, computing device 109, drive system, accessory devices, etc.). In addition, the vehicle 102 may include one or more other power electronics units (not shown) configured to manage or process power distributed among various components of the vehicle.

In some examples, the onboard charging coil 112, the onboard power electronics 116, and the power storage unit 104 may be part of the central body of the vehicle 102. In other instances, the onboard charging coil 112, the onboard power electronics 116, and the power storage unit 104 may be part of one or more detachable drive assemblies. In alternative examples, each drive assembly may have a power storage unit, while the onboard charging coil 112 and the onboard power electronics 116 are attached to the vehicle body and are connectable to the power storage unit 104. In other examples, the onboard charging coil 112, the onboard power electronics 116, and the power storage unit 104 may include a module that can be connected to, and disconnected from, other vehicle components (e.g., drive assembly), such as for retrofitting and/or modularizing.

In examples of this disclosure, the charging station 106 also includes components for non-contact-based charging. For example, the charging station 106 may include offboard power electronics (not shown) configured to convert AC power from the grid to usable DC, as well as offboard power electronics 118 configured to convert DC power to AC power for transmission by the offboard charging coil 114. In some examples, the charging station 106 may include a DC fast charger plug (not shown) that is attached to an adapter (not shown), as described in in U.S. application Ser. No. 17/334,275 (titled "DC Fast Charger Wireless-Charging Adapter" and filed May 28, 2021), which is incorporated herein by reference in its entirety and for all purposes.

When charging the power storage unit 104, heat may be generated by one or more of the various onboard and offboard charging coils. For example, for a given amount of power (e.g., 100 kW) received by the onboard charging coil 112, a percentage may be lost in the form of heat as the power flows through the onboard charging coil 112 and is processed by the onboard power electronics 116. In examples, the onboard charging coil 112 may operate at an efficiency in a range of about 95% to about 99.5%, such that for a given amount of power, about 5% to about 0.5% is lost in the form of heat. Of course, in other, less efficient examples, more heat may be generated due to such inefficiencies, and in other, more efficient examples, less heat may be generated. As such, if the onboard charging coil 112 receives 100 kW of non-contact power, then about 5.0 kW to about 0.5 kW may be lost in the form of heat. The efficiency of the onboard charging coil 112 may be affected by various factors, such as the construction, materials, size, and the like. In addition, the onboard power electronics 116 may operate at an efficiency in a range of about 95% to about 99.5%, such that for a given amount of power, about 5% to about 0.5% is lost in the form of heat.

In examples of this disclosure, the vehicle 102 includes an onboard passive heat exchanger to manage heat generated by operations of the onboard charging components. In examples, the passive heat exchanger need not include active components (e.g., pump, fan, etc.). In addition, the passive heat exchanger may not add a thermal load to the existing vehicle coolant loop (e.g., coolant lines 113), thereby reserving thermal management resources for other components (e.g., engine components, power storage unit 104, computing devices 109, etc.).

In some examples, the onboard passive heat exchanger includes an onboard cold plate 120 (e.g., cold plate reservoir or coolant reservoir) that contains a refrigerant and that is in physical contact with the onboard power electronics 116. In examples, the cold plate 120 includes a refrigerant compartment or reservoir to hold the refrigerant. In addition, the onboard passive heat exchanger may include an onboard condenser 122 that is in fluid communication with the cold plate 120. For example, a first conduit 124 (e.g., vapor conduit) may fluidly couple one portion of the cold plate 120 to the condenser 122, while a second conduit 126 (e.g., liquid conduit) may fluidly couple another portion of the cold plate 120 to the condenser 122. In examples, the onboard passive heat exchanger includes a loop thermosyphon. The cold plate 120, the condenser 122, and the conduits 124 and 126 may form a closed system containing the refrigerant under pressure. For example, the refrigerant may include R1234yf at 10 Bar or similar refrigerant.

In examples of the present disclosure, the onboard condenser 122 may be positioned adjacent to the radiator 111. In addition, the onboard condenser 122 may be positioned within a path of the airflow 128. For instance, the condenser 122 may be positioned adjacent to the radiator 111 and in a path of the airflow 128 downstream from the radiator 111. As such, after heat from the radiator 111 is dissipated to ambient air in the airflow 128, heat from the condenser 122 may then be dissipated to the ambient air (e.g., exhaust from the radiator) in the airflow 128. Based on the arrangement of the passive heat exchanger, heat from the onboard power electronics 116 may transfer to the refrigerant contained in the cold plate 120, and the refrigerant may transition to a vapor and convectively flow via the conduit 124 to the condenser 122. Once heat is dissipated through the condenser 122, the refrigerant may condensate and convectively flow back to the cold plate 120 to be used in the heat exchange process.

Figure 2:
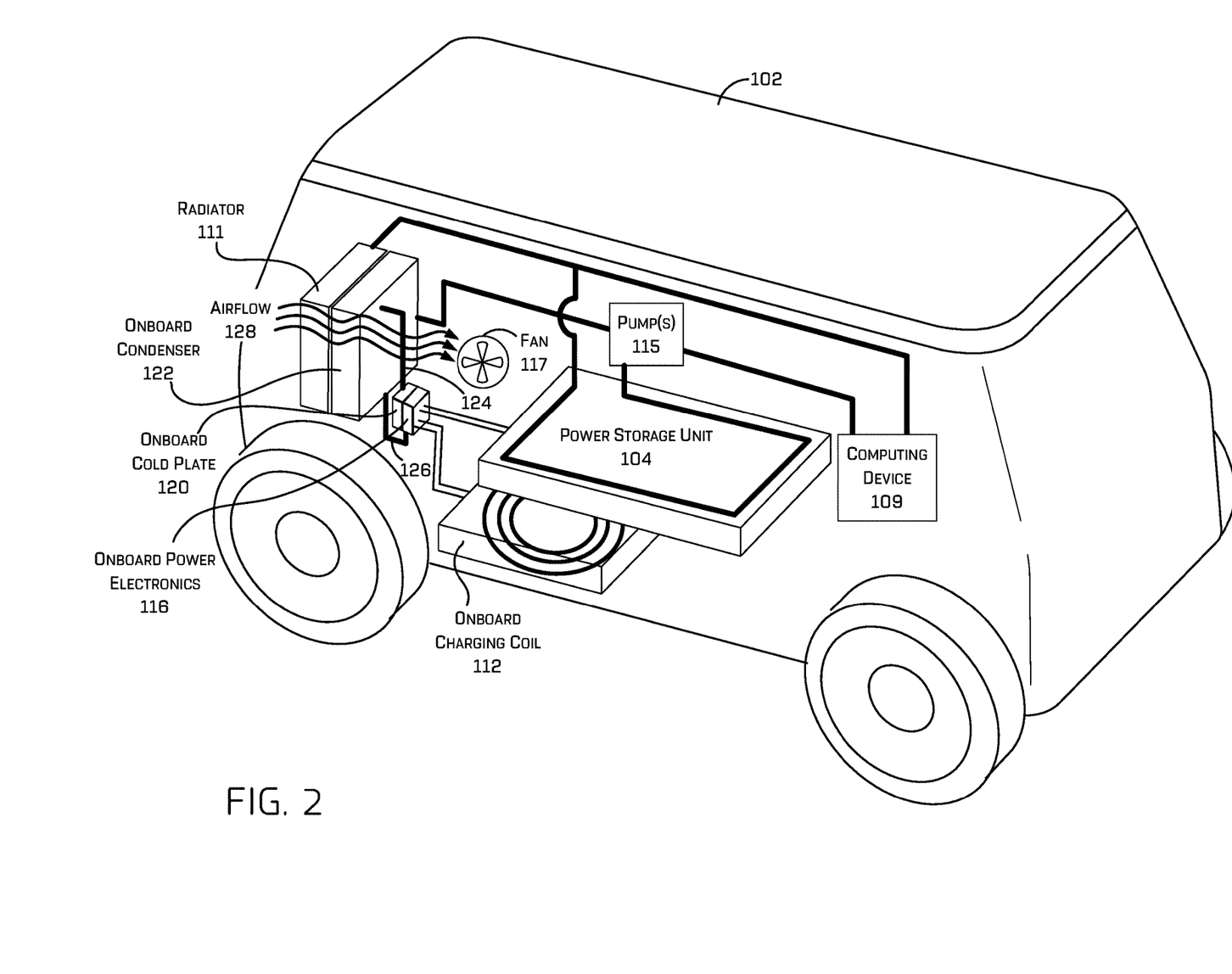
FIG. 2 depicts another perspective of the example vehicle in FIG. 1.

Referring now to FIG. 2, the vehicle 102 is illustrated from a different perspective, and FIG. 2 illustrates additional examples of the present disclosure. In some examples, the onboard condenser 122 is positioned between the fan 117 and the radiator 111, such that the airflow 128 pulls fresh air across the radiator 111 first before across the onboard condenser 122. In this respect, any impact of the onboard condenser 122 on the radiator 111 cooling operations may be limited. In some examples, the onboard condenser 122 may be positioned within the path of the airflow 128, and not necessarily directly adjacent to the radiator 111, such as where an intervening component is between the radiator 111 and the onboard condenser 122. In that case, a position of the onboard condenser 122 may still be considered between a fan (e.g., 117) and the radiator 111. Various factors may contribute to the flexibility of the passive heat exchanger and the ability to integrate with other onboard thermal management system. For example, the condenser 122 and refrigerant may be configured to condensate at a temperature functionally suited to use the exhaust air from the radiator 111. For instance, the refrigerant may condensate at a temperature above a temperature of the exhaust air. In one example, the exhaust air from the radiator 111 may include a temperature in a range of about 50 C to about 60 C, and the refrigerant in the condenser may condensate at a temperature above the temperature of the exhaust air (e.g., about 65 C). Although the passive heat exchanger need not include a separate fan, in some examples, a fan other than the radiator fan may cool the passive heat exchanger.

In addition, examples of the present disclosure include relative positioning of various components. For instance, the onboard power electronics 116 may be positioned slightly below at least a portion of the radiator 111 and the condenser 122, such that the resulting position of the onboard cold plate 120 is also slightly below the condenser 122. As such, the conduit 124 extends from the cold plate 120 in an upwards direction for a length or distance, and in examples of this disclosure, the length of the conduit 124 is conducive to the convective flow of refrigerant in vapor state from the cold plate 120 to the condenser 122. For example, the vertical length of the conduit 124 may be in a range of about 15 cm to about 30 cm. In some examples, the vertical length of the conduit 124 may be at least about 20 cm. In addition, the conduit 124 also extends downwards a distance from the condenser 122 to the cold plate 120, and in examples of this disclosure, the length of the conduit 126 is conducive to the convective flow of liquid refrigerant from the condenser 122 to the cold plate 120. For example, the vertical length of the conduit 126 may be in a range of about 7 cm to about 13 cm. In some examples, the vertical length of the conduit 126 may be at least about 10 cm. Among other things, these lengths of the conduits 124 and 126 that provide for effective heat dissipation also result in a relatively small heat exchange footprint, which efficiently uses valuable space among vehicle components. In at least some examples, the conduits 124 and 126 may be configured in additional respects (e.g., diameter) to balance thermal management functions with space and/or size requirements or limitations.

As described above, in examples of this disclosure, by pressurizing the cold plate 120, condenser 122, and conduits 124 and 126, and relying on the convective flow of the refrigerant, the refrigerant can move through the system without any pump or other active component. In addition, by placing the condenser in the airflow 128 created by the radiator fan and downstream of the radiator 111, the condenser 122 is able to dissipate the heat without needing an additional thermal load to the existing, active thermal management system of the vehicle. That is, although the dissipation of thermal energy from the condenser 122 may be facilitated at least in part by the radiator, which may be running and part of the active components of the vehicle in general, this example of the present disclosure leverages those already existing active components for cooling in a passive/closed loop system. Furthermore, the power electronics 116 may generate heat during charging-specific activities, such as when non-contact power is received by the onboard charging coil 112, and often these operations are performed when the vehicle is stationary (e.g., aligned in position with the offboard charging coil 114). As such, due to the vehicle remaining stationary, the refrigerant in the cold plate 120 is more likely to remain evenly distributed as it absorbs heat and transitions to vapor, as opposed to during other operations in which the vehicle may not be stationary. In this respect, examples of the present disclosure take advantage of the benefits of the passive heat exchanger, while minimizing potential drawbacks that might otherwise arise in use cases involving heat dissipation during vehicle motion.

In at least some examples, the onboard charging components may include one or more components (e.g., temperature sensor) configured to determine a temperature of onboard charging components (e.g., a temperature of the onboard charging coil 112, the onboard power electronics 116, etc.). Among other things, the temperature sensor may determine a temperature of the onboard power electronics 116 and provide feedback to control an amount of power transmitted from the offboard charging components to the onboard charging components. For example, the temperature sensor may determine whether a detected temperatures exceeds a temperature threshold, and if so, a signal may be transmitted (e.g., to the offboard charging components) to reduce an amount of power inductively transmitted to the onboard charging components.

FIG. 1 and FIG. 2 have been described in the context of the power electronics 116 being used to convert non-contact power received from the onboard charging coil 112, before the converted power is transmitted to, and stored in, the power storage unit. In some examples, power electronics may be connected to, and work in conjunction with, other vehicle components and in other contexts, in which case the power electronics may still be cooled using the passive heat exchanger. For example, power electronics that convert DC power from the power storage unit and/or power electronics coupled to the computing device 109 and/or to vehicle accessory devices may also be cooled using the passive heat exchanger described herein. In addition, other onboard components may be cooled using a passive heat exchanger described in these examples, such as the onboard charging coil 112. Furthermore, in some examples of the present disclosure, the onboard passive heat exchanger described with respect to FIGS. 1 and 2 may be used to dissipate heat generated by charging components (e.g., power electronics) used for contact-based charging, such as systems that physically connect on a vehicle side, front, back, or undercarriage.

Referring to FIG. 1, in some examples, a passive heat exchanger may be used with offboard charging components. For example, an offboard passive heat exchanger may include an offboard cold plate 130 that contains a refrigerant and that is in physical contact with the offboard power electronics 118. In addition, the offboard passive heat exchanger may include an offboard condenser 132 that is in fluid communication with the offboard cold plate 130 and that may dissipate heat to ambient air. The offboard passive heat exchanger may include at least some similar components as described with respect to the onboard passive heat exchanger and may function in some similar manners. For example, a third conduit 134 (e.g., vapor conduit) may fluidly couple one portion of the cold plate 130 to the condenser 132, while a fourth conduit 136 (e.g., liquid conduit) may fluidly couple another portion of the cold plate 130 to the condenser 132. In some examples, the dimensions of the conduits 134 and 136 may be similar to the dimensions of the conduits 124 and 126, respectively. The cold plate 130, the condenser 132, and the conduits 134 and 136 may form a closed system containing the refrigerant under pressure. For example, the refrigerant may include 1234yf at 10 Bar or similar refrigerant. Similar to the onboard passive heat exchanger, the refrigerant of the offboard passive heat exchanger may convectively flow through the system without any pump or other active component, and the condenser may dissipate the heat to ambient air without needing any active components. Among other things, this may reduce power demands associated with operating the charging station and may reduce maintenance costs that might otherwise be associated with active components, such as pumps and fans. Although the offboard passive heat exchanger need not include additional active components, in some examples, a fan (not shown) may be provided for cooling the condenser 132 and/or one or more other offboard components.

Figure 3:
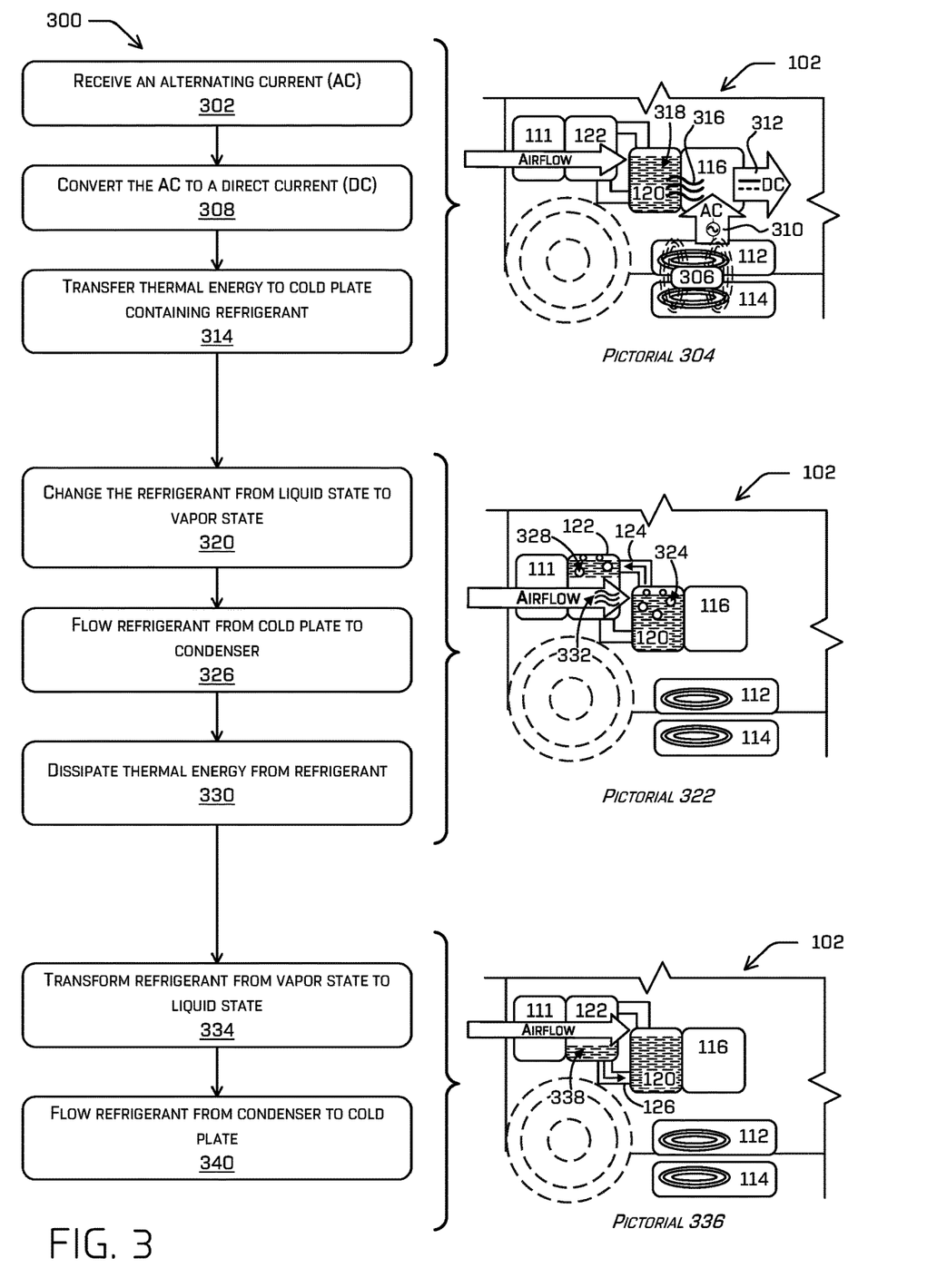
FIG. 3 includes a flow diagram of an example process for passively managing thermal energy associated with charging operations of a vehicle.

Referring now to FIG. 3, FIG. 3 depicts a flowchart showing an example process 300 involving techniques as described herein. The process 300 illustrated in FIG. 3 may be described with reference to components and elements described above with reference to FIGS. 1 and 2 for convenience and ease of understanding. In addition, steps of the process 300 are illustrated by pictorials, which include a portion of the vehicle 102 as delineated by the break lines. However, the process 300 illustrated in FIG. 3 is not limited to being performed using these components, and the components are not limited to performing the process illustrated in FIG. 3. The process illustrated in FIG. 3 is illustrated as a logical flow graph, and the order in which steps are described is not intended to be construed as a limitation. Any number of the described steps or operations can be omitted or combined in any order and/or in parallel to implement the process.

FIG. 3 includes a flow diagram with operations or steps for a process 300 for managing thermal energy in a vehicle. For example, the vehicle may be controlled to maneuver into a position that aligns an onboard charging coil 112 with an offboard charging coil 114. In some examples, controlling and/or maneuvering the vehicle may generate a first thermal energy (e.g., by the motor, power storage unit, computing device(s), and/or other thermal generators). As such, the first thermal energy may be dissipated using an active cooling system (e.g., radiator 111, coolant loop 113, pump 115, etc.). Once the onboard charging coil 112 and the offboard charging coil 114 are aligned, the power storage unit of the vehicle may be charged. For example, at step 302, the process 300 may include receiving an alternating current (AC). For example, an AC may be received by an onboard charging coil of a vehicle, and referring to the pictorial 304, the onboard charging coil 112 of the vehicle 102 is aligned with the offboard charging coil 114. The pictorial 304 also depicts that a field 306 has been created between the charging coils 112 and 114, and AC is transferred to the onboard charging coil via non-contact charging.

In examples, step 308 includes converting the AC to a direct current (DC). For example, step 308 may include converting, by a power electronics unit coupled to the onboard charging coil, the AC to a DC, and the converting may generate thermal energy. Referring to the pictorial 304, the onboard power electronics 116 convert an AC 310 to a DC 312 for use by other components (e.g., for storage in a power storage unit).

In some examples, step 314 may include transferring thermal energy (e.g., generated during step 308) to a cold plate, which contains refrigerant in liquid state. For example, step 314 may include conductively transferring at least a portion of the thermal energy (created when converting the AC to DC) to a cold plate in physical contact with the power electronics unit, the cold plate reservoir containing a liquid-state refrigerant. Referring to the pictorial 304, thermal energy 316 is conductively transferring from the power electronics 116 to a cold plate 120, which contains a liquid-state refrigerant 318.

The process 300 may also include, at step 320, changing the liquid-state refrigerant (in the cold plate) to refrigerant in vapor state. For example, step 320 may include changing, based on the portion of the thermal energy transferred to the cold plate reservoir, the liquid-state refrigerant to a vapor-state refrigerant. Referring to the pictorial 322, based on the thermal energy 316 (in pictorial 304), at least some of the refrigerant in the cold plate 120 has changed to a vapor-state refrigerant 324.

In some examples, the process 300 includes, at step 326, flowing the vapor-state refrigerant from the cold plate to the condenser. For example, step 326 may include convectively flowing the vapor-state refrigerant from the cold plate reservoir to a condenser. Referring to the pictorial 322, the directional arrow in the conduit 124 indicates a flow of the vapor-state refrigerant 324 from the cold plate 120 to the condenser 122. In addition, the pictorial 322 illustrates that at least some vapor-state refrigerant 328 is now contained in the condenser 122.

The process 300 may also include, at step 330 dissipating thermal energy from the vapor-state refrigerant. For example, step 330 may include conductively dissipating, via the condenser, the at least the portion of the thermal energy from the vapor-state refrigerant. Referring to the pictorial 322, the condenser 122 is in the path of an airflow, which is illustrated as absorbing thermal energy 332. In some examples, the airflow may be generated by the fan 117 (FIG. 2).

In examples, the process 300 includes, at step 334, transforming the vapor-state refrigerant to a liquid-state refrigerant. For example, step 334 may include transforming, based on the at least the portion of the thermal energy being dissipated, the vapor-state refrigerant (in the condenser) to liquid-state refrigerant. Referring to the pictorial 336, the vapor-state refrigerant 328 (in the pictorial 322) is now illustrated as liquid-state refrigerant 338, based on the dissipation of thermal energy 332.

The process 300 may also include, at step 340, flowing the liquid-state refrigerant from the condenser to the cold plate. For example, the directional arrow in the conduit 126 indicates a flow of the liquid-state refrigerant 338 from the condenser 122 back to the cold plate 120.

An example for performing the process 300 has been described in the context of the power electronics 116 being used to convert non-contact power received from the onboard charging coil 112, before the converted power is transmitted to, and stored in, the power storage unit. In some examples, power electronics may be connected to, and work in conjunction with, other vehicle components and in other contexts, in which case the power electronics may still be cooled using the passive heat exchanger. For example, power electronics that convert DC power from the power storage unit and/or power electronics coupled to the computing device 109 and/or to vehicle accessory devices may also be cooled using the passive heat exchanger described herein. In addition, other onboard components may be cooled using a passive heat exchanger described in these examples, such as the onboard charging coil 112. Furthermore, in some examples of the present disclosure, the process 300 described with respect to FIG. 3 may be used to dissipate heat generated by charging components (e.g., power electronics) used for contact-based charging.

In some examples, the process 300 may provide advantages. For example, the thermal energy 332 may be dissipated without adding any additional active components to the vehicle. In addition, the thermal energy 332 may be dissipated independently other active thermal management occurring on the vehicle (e.g., independently of cooling by a coolant loop of the radiator 111).

Figure 4:
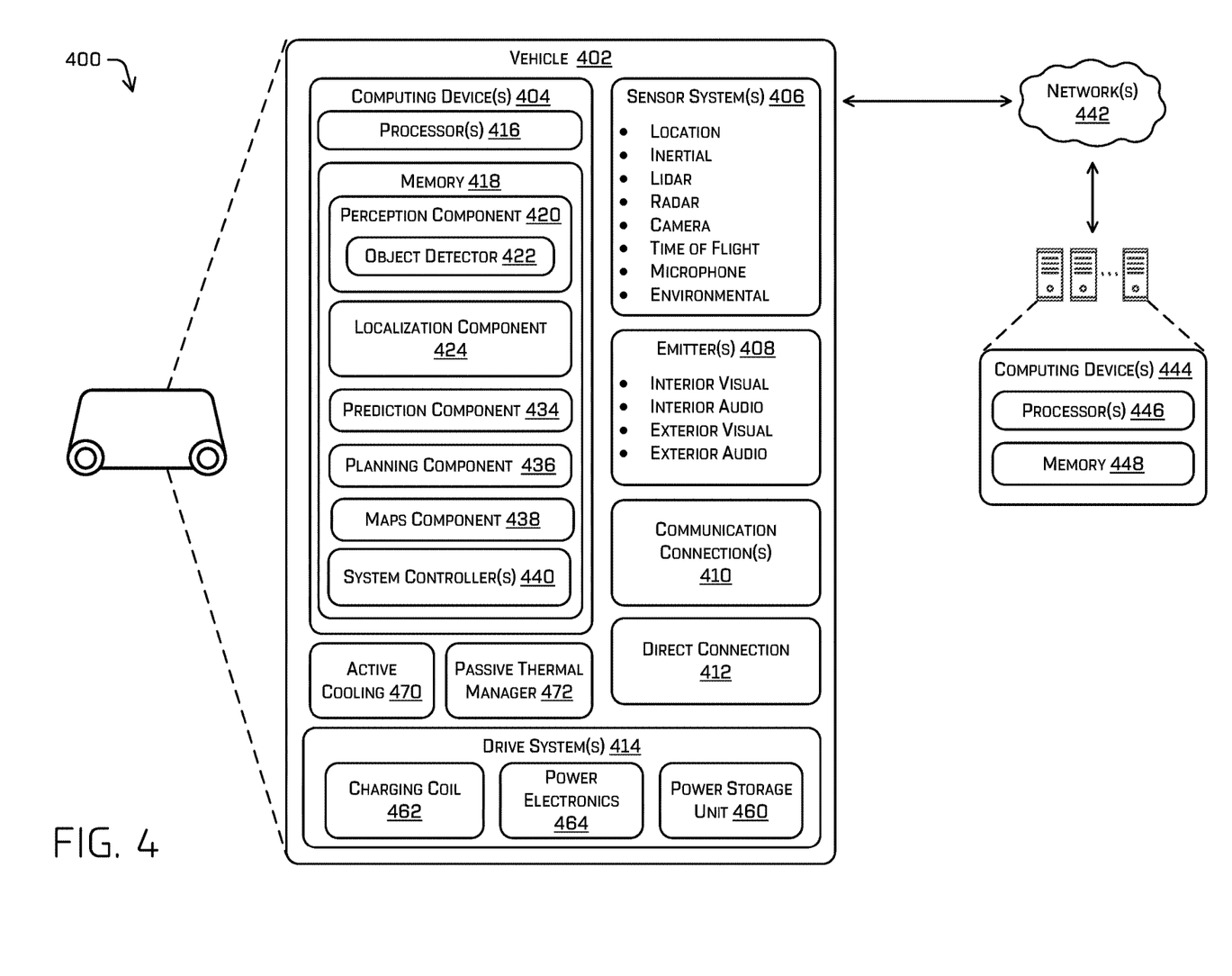
FIG. 4 is a block diagram illustrating an example system, including a vehicle, for performing techniques as described herein.

Referring now to FIG. 4, FIG. 4 depicts a block diagram of an example system 400 for implementing the techniques described herein. In at least one example, the system 400 can include a vehicle 402. In the illustrated example system 400, the vehicle 402 is an autonomous vehicle; however, the vehicle 402 can be any other type of vehicle. The vehicle 402 may be the vehicle 102 depicted in FIGS. 1, 2, and 3 and may be configured to perform various operations that generate heat and that may benefit from thermal management, including the passive heat exchangers described herein.

The vehicle 402 can be a driverless vehicle, such as an autonomous vehicle configured to operate according to a Level 4 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 402 can be configured to control all functions from start to completion of the trip, including all parking functions, it may not include a driver and/or controls for driving the vehicle 402, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 402 can include one or more computing device(s) 404, one or more sensor system(s) 406, one or more emitter(s) 408, one or more communication connection(s) 410 (also referred to as communication devices and/or modems), at least one direct connection 412 (e.g., for physically coupling with the vehicle 402 to exchange data and/or to provide power), and one or more drive system(s) 414. The one or more sensor system(s) 406 can be configured to capture sensor data associated with an environment.

The one or more sensor system(s) 406 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, ball joint sensors, chassis position sensors, etc. The one or more sensor system(s) 406 can include multiple instances of each of these or other types of sensors. For instance, the time-of-flight sensors can include individual time-of-flight sensors located at the corners, front, back, sides, and/or top of the vehicle 402. As another example, the camera sensors can include multiple cameras disposed at various locations about the exterior and/or interior of the vehicle 402. The one or more sensor system(s) 406 can provide input to the computing device 404.

The vehicle 402 can also include one or more emitter(s) 408 for emitting light and/or sound. The one or more emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 can also include one or more communication connection(s) 410 that enable communication between the vehicle 402 and one or more other local or remote computing device(s) (e.g., charging station, a remote teleoperation computing device, etc.) or remote services. For instance, the one or more communication connection(s) 410 can facilitate communication with other local computing device(s) on the vehicle 402 and/or the one or more drive system(s) 414. Also, the one or more communication connection(s) 410 can allow the vehicle 402 to communicate with other nearby computing device(s) (e.g., other nearby vehicles, traffic signals, etc.).

The one or more communications connection(s) 410 can include physical and/or logical interfaces for connecting the computing device 404 to another computing device or one or more external networks 442 (e.g., the Internet). For example, the one or more communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 4G, etc.), satellite communication, dedicated short-range communications (DSRC), or any suitable wired or wireless communications protocol that enables the respective computing device to interface with the other computing device(s).

In at least one example, the vehicle 402 can include one or more drive system(s) 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor system(s) 406 to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) 406 on the drive system(s) 414 can overlap or supplement corresponding systems of the vehicle 402 (e.g., sensor system(s) 406).

The drive system(s) 414 can include many of the vehicle systems, including a high voltage battery (e.g., power storage unit 460), an onboard charging coil 462 for wirelessly charging the high voltage battery, a motor to propel the vehicle, power electronics 464 (e.g., to bi-directionally convert between direct current and alternating current), a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) 406 and to control operation of the various vehicle systems. In some examples, the drive system controller can include one or more processor(s) and memory communicatively coupled with the one or more processor(s). The memory can store one or more components to perform various functionalities of the drive system(s) 414. Furthermore, the drive system(s) 414 also include one or more communication connection(s) that enable communication by the respective drive system with one or more other local or remote computing device(s).

The computing device 404 can include one or more processor(s) 416 and memory 418 communicatively coupled with the one or more processor(s) 416. In the illustrated example, the memory 418 of the computing device 404 stores a perception component 420, a localization component 424, a prediction component 434, a planning component 436, a maps component 438, and one or more system controller(s) 440. Though depicted as residing in the memory 418 for illustrative purposes, it is contemplated that the perception component 420, the localization component 424, the prediction component 434, the planning component 436, the maps component 438, and the one or more system controller(s) 440 can additionally, or alternatively, be accessible to the computing device 404 (e.g., stored in a different component of vehicle 402) and/or be accessible to the vehicle 402 (e.g., stored remotely).

The perception component 420 can include functionality to perform object detection, segmentation, and/or classification. In some examples, the perception component 420 and/or the object detector 422 can provide processed sensor data that indicates a presence of an entity that is proximate to the vehicle 402 and/or a classification of the entity as an entity type (e.g., car, pedestrian, cyclist, building, tree, road surface, curb, sidewalk, unknown, etc.). In additional and/or alternative examples, the perception component 420 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

Further, the perception component 420 can include functionality to store perception data generated by the perception component 420. In some instances, the perception component 420 can determine a track corresponding to an object that has been classified as an object type. For purposes of illustration only, the perception component 420, using sensor system(s) 406 can capture one or more images of an environment, which may be used to determine information about an environment.

The stored perception data can, in some examples, include fused perception data captured by the vehicle. Fused perception data can include a fusion or other combination of sensor data from sensor system(s) 406, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

In general, the object detector 422 can detect (among other things) semantic objects represented by sensor data. In some examples, the object detector 422 can identify such semantic objects and can determine a two-dimensional or a three-dimensional bounding box associated with the object. The object detector 422 can determine additional information such as a location, orientation, pose, and/or size (e.g., length, width, height, etc.) associated with the object. The object detector 422 can send data to other components of the system 400 for localization and/or determining calibration information, as discussed herein.

The localization component 424 can include functionality to receive data from the sensor system(s) 406 and/or other components to determine a position of the vehicle 402. For example, the localization component 424 can include and/or request/receive a three-dimensional map of an environment and can continuously determine a location of the autonomous vehicle within the map. In some instances, the localization component 424 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 424 can provide data to various components of the vehicle 402 to determine an initial position of an autonomous vehicle for generating a trajectory or for initial calibration.

The prediction component 434 can generate one or more probability maps representing prediction probabilities of possible locations of one or more objects in an environment. For example, the prediction component 434 can generate one or more probability maps for vehicles, pedestrians, animals, and the like within a threshold distance from the vehicle 402. In some instances, the prediction component 434 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 436 can determine a path for the vehicle 402 to follow to traverse through an environment. For example, the planning component 436 can determine various routes and paths and various levels of detail. In some instances, the planning component 436 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 436 can generate an instruction for guiding the autonomous vehicle along at least a portion of the route from the first location to the second location. In at least one example, the planning component 436 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 436 can alternatively, or additionally, use data from the perception component 420 and/or the prediction component 434 to determine a path for the vehicle 402 to follow to traverse through an environment. For example, the planning component 436 can receive data from the perception component 420 and/or the prediction component 434 regarding objects associated with an environment. Using this data, the planning component 436 can determine a route to travel from a first location (e.g., a current location) to a second location (e.g., a target location) to avoid objects in an environment. In at least some examples, such a planning component 436 may determine there is no such collision free path and, in turn, provide a path which brings vehicle 402 to a safe stop avoiding all collisions and/or otherwise mitigating damage.

The memory 418 can further include one or more maps associated with a maps component 438 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. A map can further include an object identifier, an object classification, a three-dimensional location, covariance data (e.g., represented in image data or a multi-resolution voxel space), and the like. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps from the map(s) component 438 can include at least one map (e.g., images and/or a mesh). In some examples, the vehicle 402 can be controlled based at least in part on the map(s) component 438. That is, the map(s) component 438 can be used in connection with the perception component 420 (and sub-components), the localization component 424 (and sub-components), the prediction component 434, and/or the planning component 436 to determine a location of the vehicle 402, identify objects in an environment, generate prediction probabilit(ies) associated with objects and/or the vehicle 402, and/or generate routes and/or trajectories to navigate within an environment.

In at least one example, the computing device 404 can include one or more system controller(s) 440, which can be configured to control steering, propulsion, braking, safety, emitters, communication, and other systems of the vehicle 402. These system controller(s) 440 can communicate with and/or control corresponding systems of the drive system(s) 414 and/or other components of the vehicle 402, which may be configured to operate in accordance with a path provided from the planning component 436.

Operations of the vehicle 402 may generate significant heat, such as from the drive system(s) 414, computing device(s) 404, sensor system(s) 406, and emitter(s) 408. In some examples, the vehicle 402 may include active cooling 470 (e.g., active system or active cooling system), such as a radiator system coupled, via coolant lines, to one or more other onboard components (e.g., to the computing device(s)

404 and to the drive system(s) 414). In some examples, the active cooling 470 may include a fan (e.g., 117) and one or more coolant pumps (e.g., 115). In addition, the vehicle 402 may include a passive thermal manager that dissipates heat generated during vehicle charging without requiring additional active components (e.g., in addition to the active components of the active cooling 470) and without adding significant thermal load(s) to the active cooling 470. For example, the passive thermal manager 472 may include a cold plate (e.g., 120) coupled to the power electronics 464 (or to another component that may benefit from thermal management) and a condenser (e.g., 122) positioned adjacent a radiator (e.g., of the active cooling 470) and in the air flow path of the radiator fan (e.g., downstream from the radiator).

The vehicle 402 can connect to computing device(s) 444 via network 442, and the computing device(s) may include one or more processor(s) 446 and memory 448 communicatively coupled with the one or more processor(s) 446. In at least one instance, the one or more processor(s) 446 can be similar to the processor(s) 416 and the memory 448 can be similar to the memory 418. In at least one example, the computing device(s) 444 may include a charging station, a component of the charging station, or backend device configured to managing interaction between the vehicle 402 and a charging station (e.g., authorization to charge, billing details, charging system requirements, etc.).

The processor(s) 416 of the computing device 404 and the processor(s) 446 of the computing device(s) 444 can be any suitable processor capable of executing instructions to process data and perform operations as described herein. By way of example and not limitation, the processor(s) 416 and 446 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 418 computing device 404 and the memory 448 of the computing device(s) 444 are examples of non-transitory computer-readable media. The memory 418 and 448 can store an operating system and one or more software applications, instructions, programs, and/or data to implement the methods described herein and the functions attributed to the various systems. In various implementations, the memory 418 and 448 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 418 and 448 can be implemented as a neural network. In some examples a machine learned model could be trained for object detection or trajectory planning for parking in position to align coils.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet40, ResNet101, VGG, DenseNet, PointNet, and the like.

As described above with reference to FIGS. 1-4, techniques described herein can be useful for dissipating heat generated during vehicle charging without requiring additional active components (e.g., in addition to the active fan(s) and/or coolant pump(s) that may already operate with the vehicle to dissipate heat arising from other operations) and without adding significant thermal load(s) to a vehicle's existing thermal management system. These passive thermal management solutions may be used with various onboard and offboard electronics.

Example Clauses

A: An autonomous vehicle comprising: a radiator; a fan to draw air across the radiator; a coolant loop fluidly coupled to the radiator; a pump to move a first refrigerant through the radiator and the coolant loop; one or more computing devices conductively coupled to the coolant loop, the one or more computing devices to execute one or more autonomous driving operations; a charging coil to receive an alternating current (AC); a power electronics unit coupled to the charging coil to convert the AC to direct current (DC) for storage in a power storage unit of the autonomous vehicle; and a heat exchanger comprising: a cold plate containing a second refrigerant and in physical contact with at least one of the power electronics unit or the charging coil; and a condenser in fluid communication with the cold plate and arranged in an airflow path of the fan, wherein the second refrigerant convectively flows between the cold plate and the condenser.

B: The autonomous vehicle of paragraph A further comprising: a first conduit fluidly connecting the cold plate to the condenser, the first conduit configured to contain the second refrigerant in vapor state convectively flowing between the cold plate and the condenser; and a second conduit fluidly connecting the cold plate to the condenser, the second conduit configured to contain the second refrigerant in liquid state convectively flowing between the cold plate and the condenser.

C: The autonomous vehicle of paragraph B, wherein the cold plate and the power electronics unit are positioned below at least a portion of the radiator.

D: The autonomous vehicle of any one of paragraphs A-C, wherein: the autonomous driving operations include controlling the autonomous vehicle to maneuver to a position aligning the charging coil with an offboard charging coil of a charging station; the controlling generates, by the one or more computing devices, a first thermal energy transported via the coolant loop; and based at least in part on the aligning, the AC flows to the power electronics unit, which converts the AC to the DC and generates a second thermal energy transported by the heat exchanger.

E: The autonomous vehicle of any one of paragraphs A-D, wherein the first refrigerant is fluidically isolated from the second refrigerant.

F: A system comprising: an active system for transporting a first thermal energy from first thermal generators of a vehicle; and a passive system for transporting a second thermal energy from one or more second thermal generators of the vehicle, the passive system comprising: a cold plate containing a refrigerant and in physical contact with the one or more second thermal generators; and a condenser in fluid communication with the cold plate and arranged in an airflow path of the active system, wherein the refrigerant convectively flows between the cold plate and the condenser.

G: The system of paragraph F further comprising: a first conduit fluidly connecting the cold plate to the condenser, the first conduit configured to contain the refrigerant in a vapor state convectively flowing between the cold plate and the condenser; and a second conduit fluidly connecting the cold plate to the condenser, the second conduit configured to contain the refrigerant in a liquid state convectively flowing between the cold plate and the condenser.

H: The system of paragraph G, wherein: the active system includes a radiator; and the cold plate and the one or more second thermal generators are positioned below at least a portion of the radiator.

I: The system of paragraph H, wherein: the first conduit comprises a first length extending from the cold plate to the condenser, the first length being in a range of about 15 cm to about 30 cm; and the second conduit comprises a second length extending from the cold plate to the condenser, the second length being in a range of about 7 cm to about 13 cm.

J: The system of any one of paragraphs F-I, wherein: the first thermal generators comprise one or more computing devices configured to execute one or more autonomous driving operations for the vehicle; and the one or more second thermal generator comprises a power electronics unit that converts an alternating current (AC) to a direct current (DC), which is used to charge a power storage unit of the vehicle.

K: The system of any one of paragraphs F-J, wherein the active system is fluidically isolated from the passive system and comprises: a pump to move a second refrigerant through a radiator and a coolant loop; and one or more computing devices conductively coupled to the coolant loop, the one or more computing devices to execute one or more autonomous driving operations.

L: The system of paragraph K, wherein the condenser is arranged between the radiator and a fan of the active cooling system.

M: The system of any one of paragraphs F-L further comprising: one or more processors; and one or more non-transitory computer-readable media storing instructions executable by the one or more processors, wherein the instructions, when executed, cause the one or more processors to perform operations comprising: modifying, based at least in part on sensor data indicating a temperature of the one or more second thermal generators, an operation associated with the one or more second thermal generators.

N: A method comprising: controlling a vehicle to maneuver to a position aligning an onboard charging coil of a vehicle with an offboard charging coil of a charging station, wherein the controlling generates, by one or more components of the vehicle, a first thermal energy; dissipating, using an active cooling system having a first refrigerant, the first thermal energy; charging, at least in part by the onboard charging coil aligning with the offboard charging coil, a power storage unit of the vehicle, wherein the charging generates, by one or more components of the vehicle, a second thermal energy; and dissipating, using a passive cooling system having a second refrigerant, the second thermal energy, wherein the second refrigerant is fluidically isolated from the first refrigerant.

O: The method of paragraph N further comprising, maintaining the vehicle in a stationary position when the second thermal energy is dissipated using the passive cooling system.

P: The method of either paragraph N or O, wherein the charging comprises converting, by a power electronics unit, an alternating current, received by the onboard charging coil, to a direct current, and wherein the converting generates the second thermal energy.

Q: The method of any one of paragraphs N-P further comprising, moving, by a fan of the active cooling system, a volume of air across a condenser of the passive cooling system, wherein the volume of air absorbs at least a portion of the second thermal energy dissipated from the second refrigerant.

R: The method of paragraph Q further comprising, moving, by the fan, the volume of air across a radiator of the active cooling system prior to moving the volume of air across the condenser.

S: The method of paragraph R further comprising: actively pumping the first refrigerant through a coolant loop fluidly coupled to the radiator; and absorbing, via the coolant loop, the first thermal energy from one or more of a computing device of the vehicle or a power storage unit of the vehicle.

T: The method of any one of paragraphs N-S further comprising: receiving, from a sensor associated with the one or more components of the vehicle, data indicating a temperature associated with the one or more components; and modifying, based at least in part on the data, power transferred to the onboard charging coil for charging the power storage unit.

While the example clauses described above are described with respect to one particular implementation, it should be understood that, in the context of this document, the content of the example clauses may also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
an active system for transporting a first thermal energy from first thermal generators of a vehicle; and
a passive system for transporting a second thermal energy from one or more second thermal generators of the vehicle, the passive system comprising:
    a cold plate containing a refrigerant and in physical contact with the one or more second thermal generators; and
    a condenser in fluid communication with the cold plate and arranged in an airflow path of the active system, wherein the refrigerant convectively flows between the cold plate and the condenser.

2. The system of claim 1 further comprising:
a first conduit fluidly connecting the cold plate to the condenser, the first conduit configured to contain the refrigerant in a vapor state convectively flowing between the cold plate and the condenser; and
a second conduit fluidly connecting the cold plate to the condenser, the second conduit configured to contain the refrigerant in a liquid state convectively flowing between the cold plate and the condenser.

3. The system of claim 2, wherein:
the active system includes a radiator; and
the cold plate and the one or more second thermal generators are positioned below at least a portion of the radiator.

4. The system of claim 3, wherein:
the first conduit comprises a first length extending from the cold plate to the condenser, the first length being in a range of about 15 cm to about 30 cm; and
the second conduit comprises a second length extending from the cold plate to the condenser, the second length being in a range of about 7 cm to about 13 cm.

5. The system of claim 1, wherein:
the first thermal generators comprise one or more computing devices configured to execute one or more autonomous driving operations for the vehicle; and
the one or more second thermal generator comprises a power electronics unit that converts an alternating current (AC) to a direct current (DC), which is used to charge a power storage unit of the vehicle.

6. The system of claim 1, wherein the active system is fluidically isolated from the passive system and comprises:
a pump to move a second refrigerant through a radiator and a coolant loop; and
one or more computing devices conductively coupled to the coolant loop, the one or more computing devices to execute one or more autonomous driving operations.

7. The system of claim 6, wherein the condenser is arranged between the radiator and a fan of the active system.

8. The system of claim 1 further comprising:
one or more processors; and
one or more non-transitory computer-readable media storing instructions executable by the one or more processors, wherein the instructions, when executed, cause the one or more processors to perform operations comprising:
    modifying, based at least in part on sensor data indicating a temperature of the one or more second thermal generators, an operation associated with the one or more second thermal generators.

9. An autonomous vehicle comprising:
an active system for transporting a first thermal energy from first thermal generators of a vehicle; and
a passive system for transporting a second thermal energy from one or more second thermal generators of the vehicle, the passive system comprising:
    a cold plate containing a refrigerant and in physical contact with the one or more second thermal generators; and
    a condenser in fluid communication with the cold plate and arranged in an airflow path of the active system, wherein the refrigerant convectively flows between the cold plate and the condenser.

10. The autonomous vehicle of claim 9, further comprising:
a first conduit fluidly connecting the cold plate to the condenser, the first conduit configured to contain the refrigerant in a vapor state convectively flowing between the cold plate and the condenser; and
a second conduit fluidly connecting the cold plate to the condenser, the second conduit configured to contain the refrigerant in a liquid state convectively flowing between the cold plate and the condenser.

11. The autonomous vehicle of claim 10, wherein:
the active system includes a radiator; and
the cold plate and the one or more second thermal generators are positioned below at least a portion of the radiator.

12. The autonomous vehicle of claim 11, wherein:
the first conduit comprises a first length extending from the cold plate to the condenser, the first length being in a range of about 15 cm to about 30 cm; and
the second conduit comprises a second length extending from the cold plate to the condenser, the second length being in a range of about 7 cm to about 13 cm.

13. The autonomous vehicle of claim 11, wherein:
the first thermal generators comprise one or more computing devices configured to execute one or more autonomous driving operations for the vehicle; and the one or more second thermal generator comprises a power electronics unit that converts an alternating current (AC) to a direct current (DC), which is used to charge a power storage unit of the vehicle.

14. A thermal management system comprising:
an active system for transporting a first thermal energy from first thermal generators of a vehicle; and
a passive system for transporting a second thermal energy from one or more second thermal generators of the vehicle, the passive system comprising:
    a cold plate containing a refrigerant and in physical contact with the one or more second thermal generators; and
    a condenser in fluid communication with the cold plate and arranged in an airflow path of the active system, wherein the refrigerant convectively flows between the cold plate and the condenser.

15. The thermal management system of claim 14, further comprising:
    a first conduit fluidly connecting the cold plate to the condenser, the first conduit configured to contain the refrigerant in a vapor state convectively flowing between the cold plate and the condenser; and
    a second conduit fluidly connecting the cold plate to the condenser, the second conduit configured to contain the refrigerant in a liquid state convectively flowing between the cold plate and the condenser.

16. The thermal management system of claim 15, wherein:
    the active system includes a radiator; and
    the cold plate and the one or more second thermal generators are positioned below at least a portion of the radiator.

17. The thermal management system of claim 16, wherein:
    the first conduit comprises a first length extending from the cold plate to the condenser, the first length being in a range of about 15 cm to about 30 cm; and
    the second conduit comprises a second length extending from the cold plate to the condenser, the second length being in a range of about 7 cm to about 13 cm.

18. The thermal management system of claim 14, wherein:
    the first thermal generators comprise one or more computing devices configured to execute one or more autonomous driving operations for the vehicle; and
    the one or more second thermal generator comprises a power electronics unit that converts an alternating current (AC) to a direct current (DC), which is used to charge a power storage unit of the vehicle.

19. The thermal management system of claim 14, wherein the active system is fluidically isolated from the passive system and comprises:
    a pump to move a second refrigerant through a radiator and a coolant loop; and
    one or more computing devices conductively coupled to the coolant loop, the one or more computing devices to execute one or more autonomous driving operations.

20. The thermal management system of claim 19, wherein the condenser is arranged between the radiator and a fan of the active system.

* * * * *